United States Patent [19]
Liu

[11] Patent Number: 5,999,421
[45] Date of Patent: Dec. 7, 1999

[54] DUAL-CHANNEL POWER SYSTEM WITH AN EIGHT-PIN PWM CONTROL CHIP

[76] Inventor: Kwang H. Liu, 714, Jura Way, Sunnyvale, Calif. 94087

[21] Appl. No.: 09/282,804

[22] Filed: Mar. 31, 1999

[51] Int. Cl.$^6$ .................................................. H02M 3/335
[52] U.S. Cl. ................................................................ 363/21
[58] Field of Search ................................. 363/16, 20, 21, 363/95, 97, 131

[56] References Cited

U.S. PATENT DOCUMENTS

| | | | |
|---|---|---|---|
| 4,672,518 | 6/1987 | Murdock | 363/21 |
| 4,740,879 | 4/1988 | Peruth | 363/131 |
| 4,959,606 | 9/1990 | Forge | 323/286 |
| 4,975,823 | 12/1990 | Rilly | 363/56 |
| 5,285,369 | 2/1994 | Balakrishnan | 363/49 |
| 5,313,381 | 5/1994 | Balakrishnan | 363/147 |
| 5,351,177 | 9/1994 | Megeid | 363/21 |
| 5,412,556 | 5/1995 | Marinus | 363/21 |
| 5,422,562 | 6/1995 | Mammano | 323/282 |
| 5,703,764 | 12/1997 | Hermann et al. | 363/21 |
| 5,790,391 | 8/1998 | Stich et al. | 363/24 |
| 5,867,373 | 2/1999 | Lohrer et al. | 363/19 |

OTHER PUBLICATIONS

Unitrode Product Data Handbook, Apr. 1996, Unitrode Corporation. Merrimack, NH 03054, p. 3–192 to 3–198; p. 3–282 to 3–298.

*Primary Examiner*—Matthew Nguyen

[57] ABSTRACT

An embodiment of a dual-channel switching power system comprises a standby power supply and a main power supply both regulated by an eight-pin control chip. The control chip generates two sets of pulse-width modulation signal from a common clock oscillator and regulates the two power supplies during alternate clock cycles. The switching frequency and over-current limits of the two power supplies are adjustable by selecting different resistance values for two external resistors. The control chip provides an independent over-current protection to each power supply by monitoring the input power flow of the two power supplies via a common current-sense resistor.

10 Claims, 5 Drawing Sheets

DUAL-CHANNEL POWER SYSTEM WITH AN EIGHT-PIN PWM CONTROL CHIP

FIELD OF THE INVENTION

The present invention relates generally to semiconductor integrated circuits and more particularly to integrated circuit devices controlling switching power supplies for computers and electronic equipment.

BACKGROUND OF THE INVENTION

The typical usage pattern of a personal computer is a period of active use followed by a period of idle state when the computer user is away tending other work. Further, many people leave their computers and monitors on after a working day, sometimes even over weekends. The total wasted power associated with all idling computers in an office can be very substantial. Further, many constituent electronic and mechanical components such as electrolytic capacitors, CRT monitors, and DC fans have finite life expectancy. Leaving computers on throughout after-work hours will shorten their usable life.

To promote energy saving of computers and to enhance the usable life of constituent components, a commonly used approach is to divide a computer power system into a standby power supply and a main power supply. FIG. 1 illustrates such a dual-channel computer power system. A standby power supply 10, typically with 5 to 10 watts of output power, supplies the operating power to a system supervisory circuit, volatile memory such as Dynamic RAM (DRAM), and a power management controller 90. A main power supply 20, typically with 100 to 300 watts of output power, on the other hand, supplies the operating power to a central processing unit (CPU), a hard-disk drive, a CD-ROM drive, a modem, DC fans, and other loads.

Upon detecting the computer has entered a long period of idle state, power management controller 90 pulls a SLEEP command line 92 to high state, thereby turns off main power supply 20 via a photo-coupler 93. The system power is reduced to less than 10 watts. Standby power supply 10 remains on, keeping the system supervisory circuit and power management controller 90 active. Upon the return of user activity, power management controller 90 pulls SLEEP command line 92 to low state, thus revives main power supply 20.

FIG. 2 illustrates a prior art embodiment of a dual-channel power system. A bridge rectifier 31 and a filter capacitor 32 rectify the incoming AC line voltage into a bulk DC voltage 30 and supply it to standby power supply 10 as well as to main power supply 20.

A pulse-width modulation chip 80, exemplified by a UC3842 current-mode PWM chip marketed by Unitrode Corporation (Merrimack, N.H.), controls standby power supply 10. A transformer 40 with a primary winding 41, a pair of secondary windings 42 and 43, is energized by DC voltage 30 through the control of a power MOSFET 35, which is in turn driven by a pulse-width modulation signal 37 from PWM chip 80. By using a proper turns-ratio, the voltage levels of two outputs, a +5V STANDBY 50 and a VCC supply 52, track each other closely under varying line and load conditions.

A boot-strap resistor 33 provides initial start-up power to PWM chip 80. PWM chip 80 has several internal functional circuit blocks. An under-voltage lockout circuit 81 ensures a proper starting-up voltage level from VCC supply 52. A 5V band-gap reference circuit 82 generates a 5V reference voltage 60. A clock oscillator 83 generates a continuous stream of pulses 88, whose frequency can be set by an external timing resistor 61 and an external timing capacitor 62. An error amplifier 84, a current-sense comparator 85, an R-S flip-flop 86, and a gate drive 89 combine to provide a current-mode PWM control for regulating VCC supply 52, thereby cross regulating +5V STANDBY 50. A current-sense resistor 36, connected between MOSFET 35 and the ground, provides an input current signal 38 for PWM chip 80 to monitor input current waveform and to detect any over-current condition. Each clock pulse 88 sets flip-flop 86 to high state and initiates a new PWM cycle. A PWM cycle is ended when input current signal 38 overtakes the scaled-down output of error amplifier 84 at the input of current-sense comparator 85.

In the event of an over-load or a short-circuit condition on standby power supply 10, the input current, Iin, flowing through MOSFET 35 and current-sense resistor 36 ramps up quickly. Input current signal 38, which is the product of Iin and the resistance of current-sense resistor 36, ramps up quickly. As soon as input current signal 38 exceeds 1.0V, current-sense comparator 85 output goes high, thus resets flip-flop 86. Gate drive 89 and MOSFET 35 shuts down immediately, thereby pre-empts the turn-on period. By using a fast current-sense comparator, the UC3842 is capable of a pulse-by-pulse current limiting. Further, simply by using different resistance values for current-sense resistor 36, UC3842 allows flexible adjustment of over-current protection level to match different power supplies' full-load current ratings.

An identical PWM chip 180 controls main power supply 20, which shares bulk DC voltage 30 with standby power supply 10. A transformer 140, energized by a power MOSFET 135, produces a +5V MAIN 150 output. A secondary-side error amplifier 112 senses +5V MAIN 150 and compared it with a secondary-side 2.50V reference 110. The output of error amplifier 112 is transmitted to PWM chip 180 via a photo-coupler 114, which provides a required primary-to-secondary isolation. A current-sense resistor 136 provides an input current signal 138 for PWM chip 180 to monitor input current waveform and to detect any over-current condition.

PWM chip 180 derives its VCC supply 98 from VCC supply 52 via a pair of transistors 94 and 95 and a self-bias resistor 96. SLEEP command line 92 controls the on-off of main power supply 20 by controlling VCC supply 98. When SLEEP command line 92 is pulled high by the system's power management controller, photo-coupler 93 turns on and diverts the base current of transistor 95 to ground. Transistors 94 and 95 are both turned off. PWM chip 180 shuts down as its VCC supply 98 is cut off.

Another prior art, exemplified by a UCC3810 dual-channel synchronized current-mode PWM controller, also marketed by Unitrode Corporation, integrates the equivalent of two UC3842 chips into a 16-pin package. FIG. 3 is a block diagram of UCC3810 PWM controller. The UCC3810 is capable of driving and regulating two power supplies. However, as a rule of thumb, the cost of packaging and testing is proportional to the number of pins of an IC. Therefore, there is a need for a dual-channel PWM control chip that has a minimum number of pins. Further, the industry standard packages are available in the form of 8-pin, 14-pin and 16-pin. Non-standard packages such as 6-pin, 10-pin and 12-pin require special tooling and customized test handlers.

The disclosure of U.S. Pat. No. 5,313,381 to Balakrishnan describes a three-terminal switched mode power supply IC wherein a PWM controller and a power MOSFET are integrated into a 3-pin package such as TO-220. However, this prior art relies on a built-in oscillator and current-sense circuit to reduce its pin counts. There is no flexibility to adjust its switching frequency or synchronize it to an external clock frequency. And since it uses an internal fixed over-current limit, a power supply IC according to this prior art can not be adjusted to match different full-load current ratings. Further, since it integrates a power MOSFET of pre-defined power and voltage ratings, there is no flexibility of using external power MOSFETs of various sizes, ratings, or packaging styles.

Thus there is a need for a dual-channel PWM control chip that has a minimum number of pins, uses few external components and yet maintains adjustable over-current limits and adjustable switching frequency. Preferably, the dual-channel control chip is packaged in an industrial standard 8-pin semiconductor package such as DIP-8 (8-pin Dual Inline) or SO-8 (8-pin Small Outline).

SUMMARY OF THE INVENTION

It is an object of the present invention to provide a dual-channel power system that is regulated by an 8-pin PWM control chip and uses few additional components.

More specifically, a preferred embodiment of the present invention is a power system comprising a standby power supply, a main power supply, and a dual-channel PWM controller chip. The control chip generates two sets of PWM control from a common clock oscillator and output voltage feedback signals of the two power supplies. One set of PWM control is synchronized to odd-numbered clock pulses, and the other set of PWM control is synchronized to even-numbered clock pulses. A de-multiplex circuit extracts two sets of current signal from a common current-sense resistor. The control chip further provides independent over-current protection to each power supply.

An advantage of the present invention is a dual-channel PWM control chip regulating a standby power supply and a main power supply, having a minimum number of pins, and requiring few external components.

Another advantage of the present invention is deleted redundancy in a dual-channel power system by sharing many functional circuits, resulting in lower chip implementation cost.

A further advantage of the present invention is the PWM control chip needs only a single current-sense resistor to monitor the input current and provide over-current protection to both power supplies.

A further advantage of the present invention is the PWM control chip still provides the flexibility of adjustable switching frequency and adjustable over-current limits.

A further advantage of the present invention is that a smaller chip package and fewer external components reduce the size of the overall power system.

DESCRIPTION OF THE PREFERRED EMBODIMENTS

Figure 1:
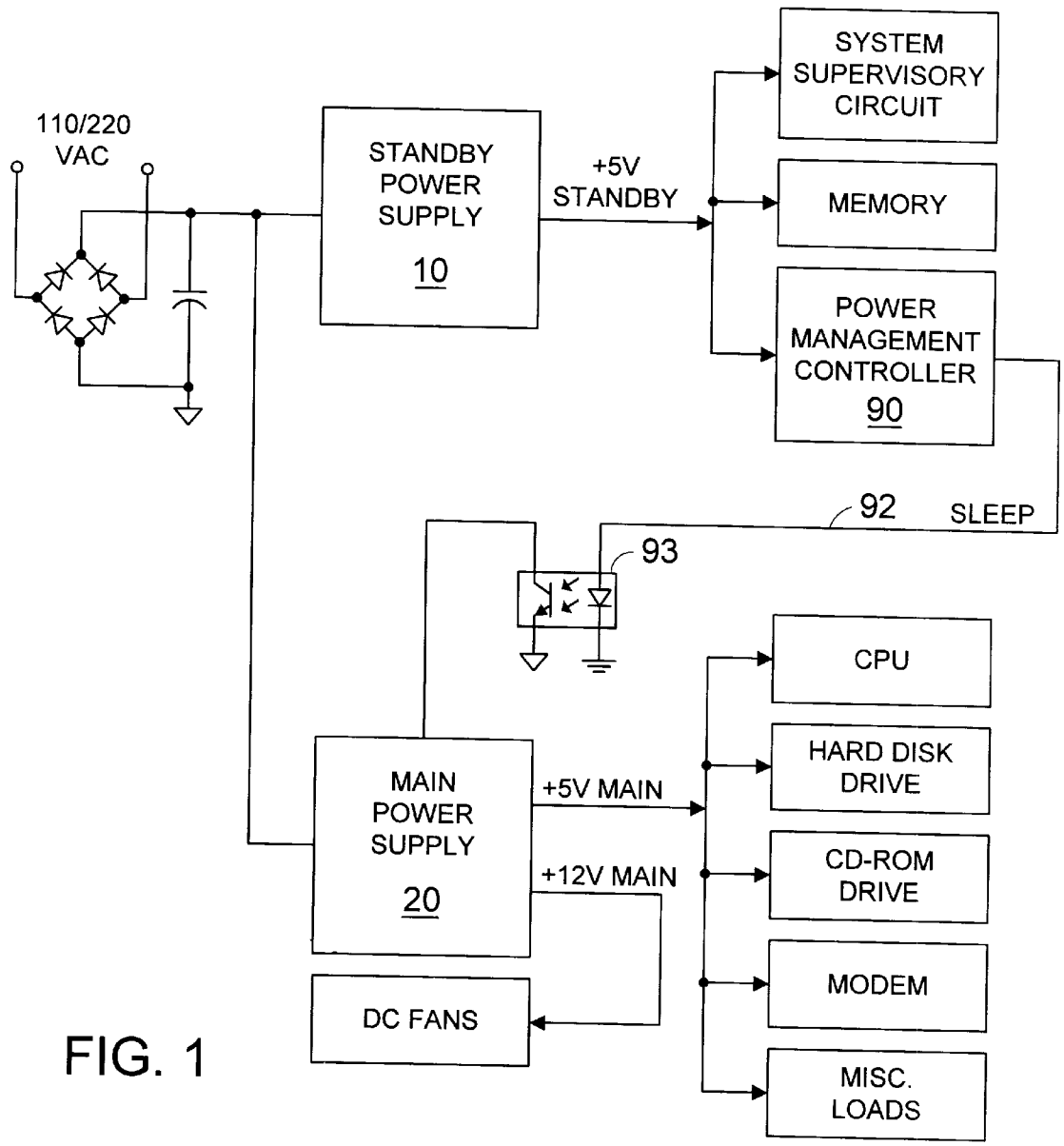
FIG. 1 is a block diagram of a dual-channel computer power system that includes a sleep-mode control.
Figure 2:
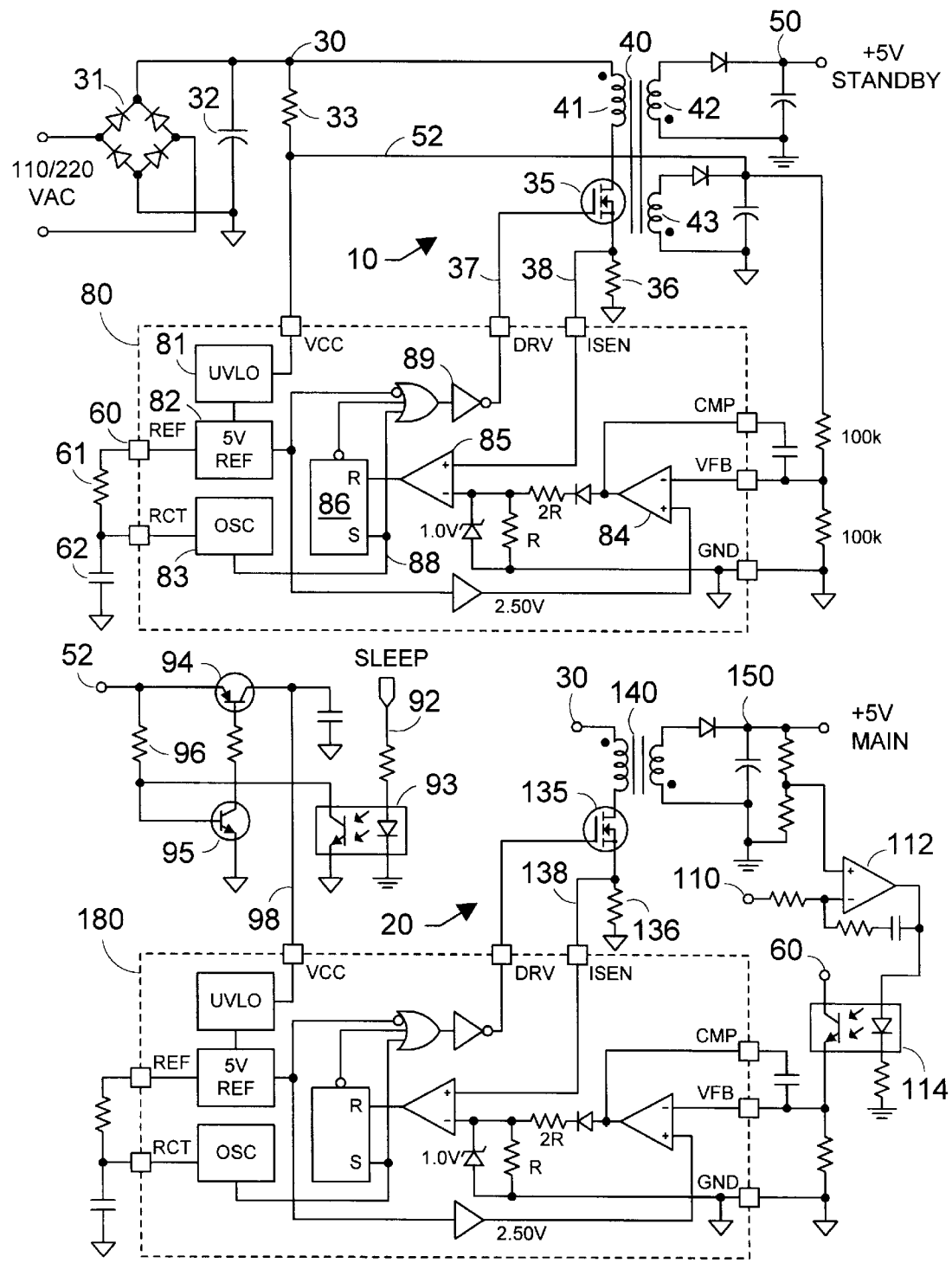
FIG. 2 is a schematic diagram of a dual-channel computer power system according to a prior art wherein the power system uses two separate PWM control chips and two sets of associated external components.
Figure 3:
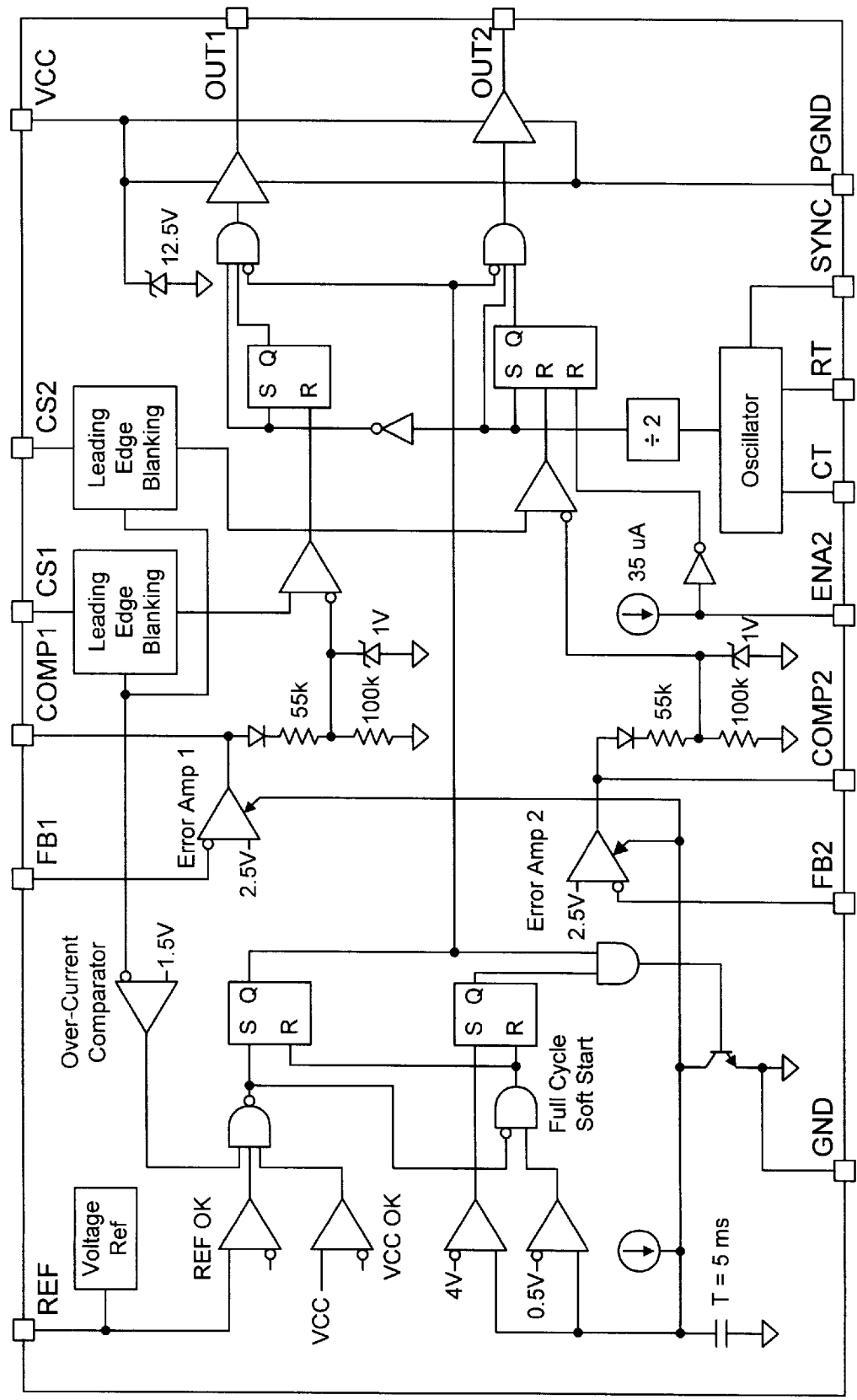
FIG. 3 is a block diagram of a 16-pin dual-channel current-mode PWM chip according to another prior art.
Figure 4:
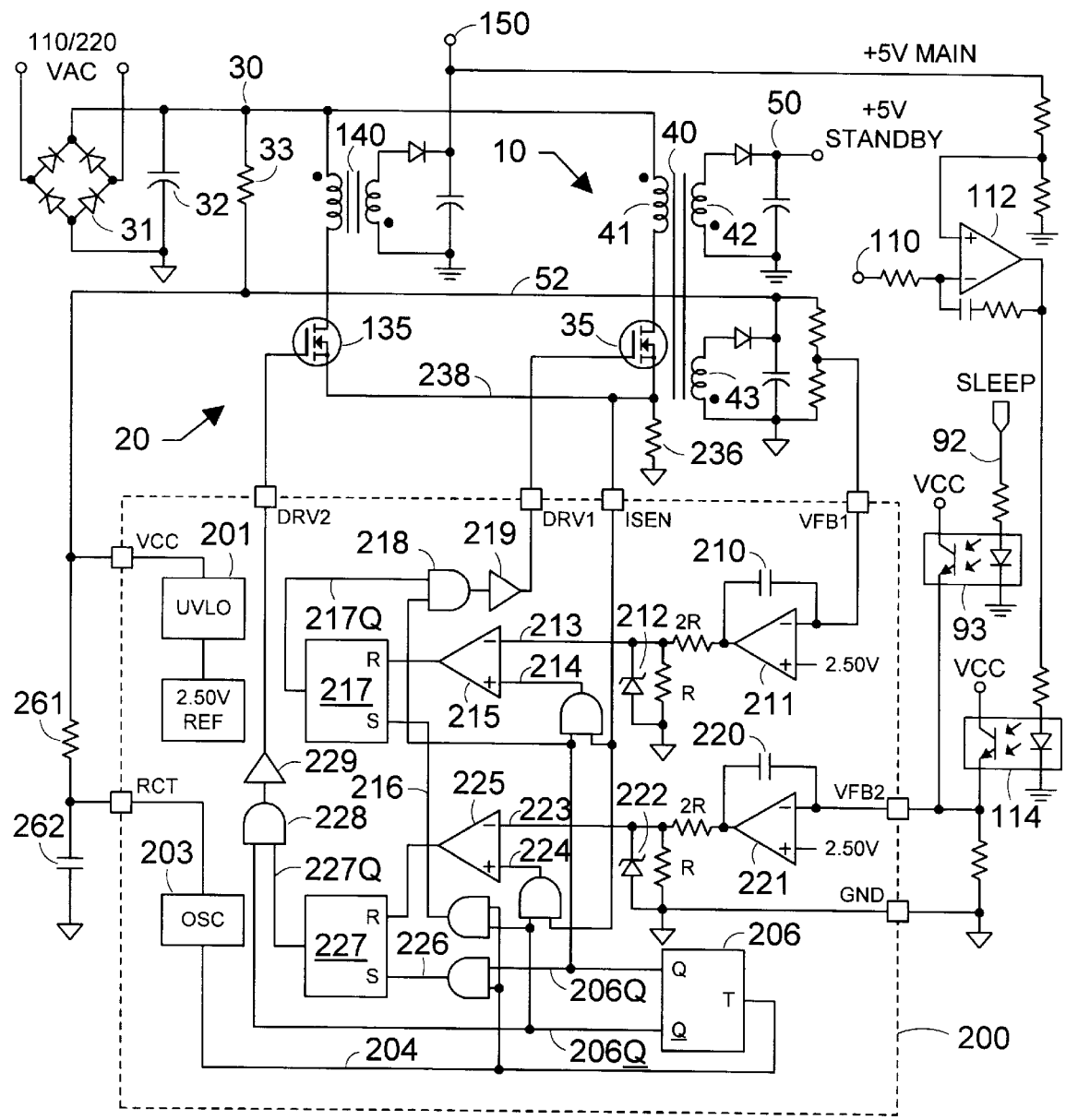
FIG. 4 is a schematic diagram of a dual-channel power system according to a preferred embodiment of the present invention.
Figure 5:
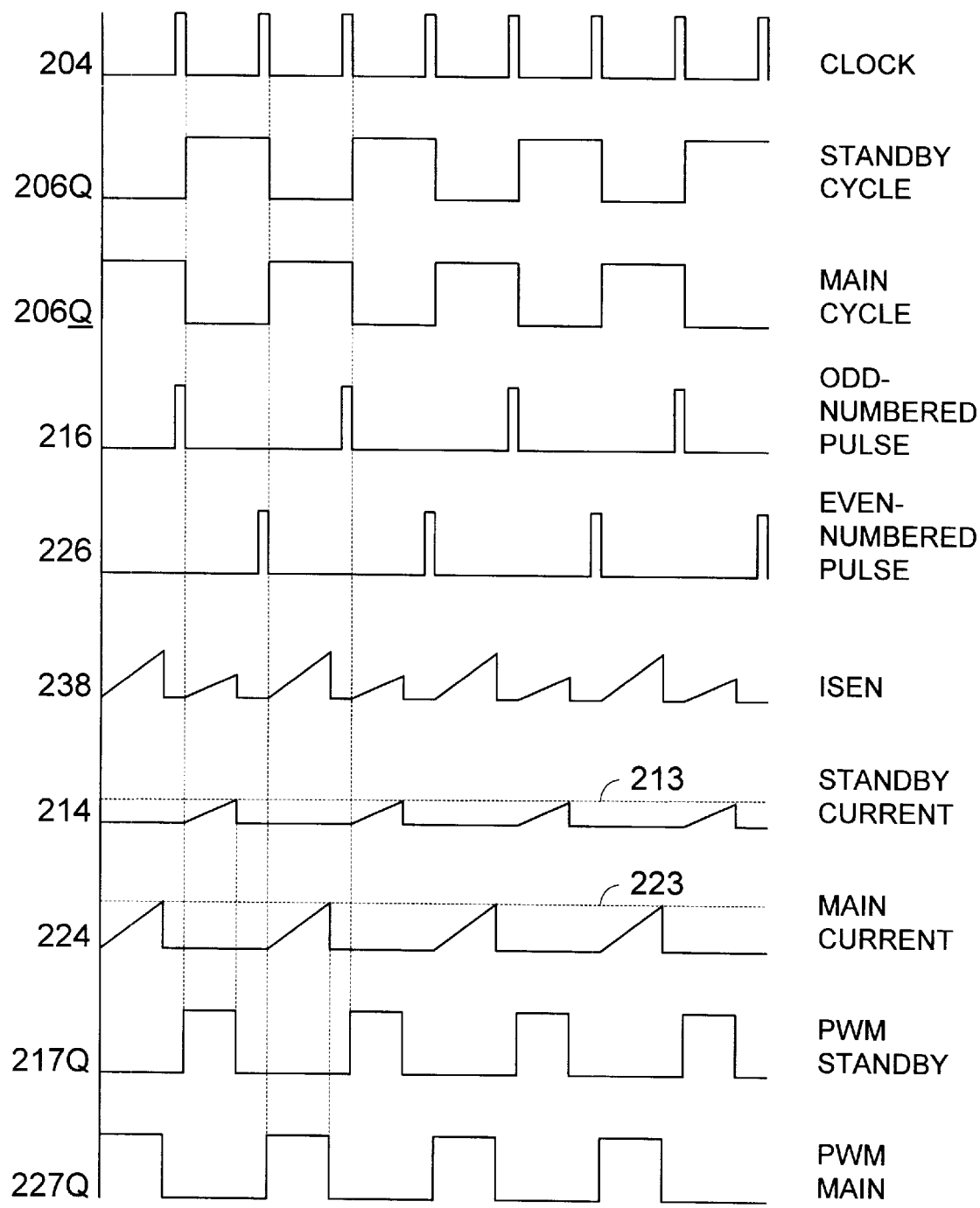
FIG. 5 illustrates key waveforms of the dual-channel power system of FIG. 4.

Referring to FIG. 4, a dual-channel power system according to a preferred embodiment of the present invention is illustrated. A dual-channel PWM control chip 200 regulates standby power supply 10 and main power supply 20. Bootstrap resistor 33 provides initial start-up power to PWM chip 200. Once the voltage on VCC supply 52 exceeds a preset value, 5.0V for example, an under-voltage lock-out circuit 201 sets PWM chip 200 into operation. An external resistor 261 and an external capacitor 262 set up the switching frequency of a clock oscillator 203. Oscillator 203 generates a continuous stream of clock pulses 204. A T flip-flop 206 divides clock pulse stream 204 into two half-frequency, out-of-phase, square-wave outputs: standby cycle signal 206Q and main cycle signal 206Q. These two outputs and clock pulse stream 204 are modulated into an odd-numbered pulse stream 216 and an even-numbered pulse stream 226 by two AND gates, as shown in FIG. 5. Each odd-numbered pulse 216 sets an R-S flip-flop 217 into high state. Its output 217Q goes high, thus enables a gate drive 219. Power MOSFET 35 turns on, and input current ramps up. An input current signal 238 on a current-sense resistor 236 is returned to PWM chip 200. Internally, another two AND gates separate input current signal 238 into a standby current signal 214 and a main current signal 224. When standby current signal 214 ramps up to the level of a scaled error voltage 213, a current-sense comparator 215 output goes high and resets flip-flop 217. Flip-flop 217 output goes low, thus disables gate drive 219 and turns off power MOSFET 35. For a close-loop regulation, a VFB1 pin of PWM chip 200 receives a feedback signal from VCC supply 52. An error amplifier 211 compares the divided voltage of VCC supply 52 with a 2.50V reference voltage. Error amplifier 211 uses an internal compensation capacitor 210. The error voltage output of error amplifier 211 is scaled down by a factor of three, but is clamped to no more than 0.25V by a zener device 212. The scaled error voltage output 213 is connected to the inverted input terminal of current-sense comparator 215. This closes the control loop for standby power supply 10.

In the event of an over-load or a short-circuit condition on standby power supply 10, input current flowing through MOSFET 35 and current-sense resistor 236 ramps up very fast. As soon as standby current signal 214 exceeds 0.25V, current-sense comparator 215 output goes high, thus resets flip-flop 217. Gate drive 219 shuts down immediately, pre-empting the turn-on period of MOSFET 35. The waveforms in FIG. 5 illustrate standby cycle signal 206Q separates standby current signal 214 from input current signal 238.

The control loop for main power supply 20 is similar to the control loop for standby power supply 10 described above. For a close-loop regulation, +5V MAIN voltage 150 is divided and compared with secondary-side reference voltage 110 through secondary-side error amplifier 112. The output of error amplifier 112 is transmitted to the VFB2 pin of PWM chip 200 via a photo-coupler 114. The VFB2 pin is connected to an error amplifier 221, which uses an internal compensation capacitor 220. The output of error amplifier 221 is scaled down by a factor of three as a scaled error voltage 223, which is clamped to no more than 1.0V by a zener device 222. A current-sense comparator 225 compares scaled error voltage 223 with main current signal 224. Each even-numbered pulse 226 sets R-S flip-flop 227 into high state, turning on a gate drive 229 and power MOSFET 135. When main current signal 224 ramps up to the level of scaled error voltage 223, current-sense comparator 225 output goes high and resets flip-flop 227, thus turns off power MOSFET 135.

Similarly, in the event of an over-load or a short-circuit condition on main power supply 20, input current flowing through MOSFET 135 and current-sense resistor 236 ramps up very fast. As soon as main current signal 224 exceeds 1.0V, current-sense comparator 225 output goes high, thus resets flip-flop 227. Gate drive 229 shuts down immediately, pre-empting the turn-on period of MOSFET 135. The waveforms in FIG. 5 also illustrate main cycle signal 206Q separates main current signal 224 from current-sense signal 238.

Further, main power supply 20 can be turned off or on by pulling SLEEP command line 92 high or low, respectively. Photo-coupler 93, providing a necessary primary-to-secondary isolation, transmits SLEEP command 92 to the VFB2 pin of PWM chip 200, PWM chip 200 further ensures the turn-on duty-cycle of either power MOSFET will not exceed 50%. This is accomplished by using an AND gate 218 and standby cycle signal 206Q to turn off gate drive 219 at the end of each standby cycle. Another AND gate 228 and main cycle signal 206Q turn off gate drive 229 at the end of each main cycle.

A general description of the present invention as well as a preferred embodiment has been provided above. The dual-channel PWM control chip according to the present invention uses a single current-sense resistor for regulating two power supplies. The current-sense signal is separated within the control chip into a standby current signal and a main current signal. The over-current limits of the two power supplies are adjustable by replacing the resistance value of the current-sense resistor. The control chip also provides a connection terminal allowing flexible adjustment of its switching frequency. Further, this dual-channel PWM control chip can be integrated into a standard 8-pin IC package. There are few additional components required to implement a dual-channel power system capable of entering a power-saving mode under the control of a system SLEEP command.

One skilled in the art will recognize and be able to make many alterations and modifications after having read the above disclosure. Accordingly, it is intended that the appended claims be interpreted as covering such alternatives, modifications, and equivalents, as can be reasonably included within the spirit and scope of the invention.

What is claimed is:

1. A dual-channel switching power system comprising:
   rectifier means for producing a bulk DC voltage from an AC power source;
   a filter capacitor connected to the output of said rectifier means for smoothing said bulk DC voltage;
   a standby power unit coupled to said bulk DC voltage for producing a bias voltage and at least an isolated standby output voltage, said standby power unit including:
     a standby transformer having at least a primary winding, a bias winding, and a standby output winding, wherein said primary winding is coupled to said bulk DC voltage;
     a standby power MOSFET having a drain terminal connected to said primary winding of said standby transformer, a gate terminal, and a source terminal;
     bias rectifier means and a bias capacitor coupled to said bias winding for producing said bias voltage; and
     standby output rectifier means and a standby output capacitor coupled to said standby output winding for producing said isolated standby output voltage;
   a main power unit coupled to said bulk DC voltage for producing at least an isolated main output voltage, said main power unit comprising:
     a main transformer having at least a primary winding and a main output winding, wherein said primary winding is coupled to said bulk DC voltage;
     a main power MOSFET, having a drain terminal connected to said primary winding of said main transformer, a gate terminal, and a source terminal connected to the source terminal of said standby power MOSFET; and
     main output rectifier means and a main output capacitor coupled to said main output winding for producing said isolated main output voltage;
   a dual-channel pulse-width-modulation control chip having exactly eight electrical connection terminals for providing independent regulation and over-current protection to said standby power unit and said main power unit; and
   a current-sense resistor for producing an input current signal, having a first end connected to the common source terminal of said standby power MOSFET and said main power MOSFET, and a second end connected to the reference ground of said bulk DC voltage.

2. The power system according to claim 1, wherein said control chip includes:
   a bias supply connection terminal for receiving operating power from said bias voltage;
   a reference ground connection terminal connected to the reference ground of said bulk DC voltage;
   a current sense connection terminal for receiving said input current signal from said current-sense resistor;
   oscillator means for producing a clock frequency;
   a clock connection terminal coupled to a pair of external resistor and capacitor for adjusting the clock frequency of said oscillator means;
   de-multiplex means for extracting from said input current signal a standby current signal and a main current signal;
   a first feedback connection terminal for receiving a feedback signal from said standby output voltage via a first photo-coupler device;
   a second feedback connection terminal for receiving a feedback signal from said main output voltage via a second photo-coupler device;
   first regulation means for producing a standby PWM signal according to said standby output voltage feedback signal and said standby current signal to regulate said standby output voltage;
   second regulation means for producing a main PWM signal according to said main output voltage feedback signal and said main current signal to regulate said main output voltage;
   a first gate drive connection terminal connected to the gate terminal of said standby power MOSFET, for energizing said standby power MOSFET in accordance with said standby PWM signal; and
   a second gate drive connection terminal connected to the gate terminal of said main power MOSFET, for energizing said main power MOSFET in accordance with said main PWM signal.

3. The power system according to claim 1, wherein the over-current limits of both said standby power unit and said main power unit are adjusted by substituting the resistance value of said current-sense resistor.

4. The power system according to claim 1, further includes a boot-strap resistor connected between said bulk DC voltage and said control chip for providing start-up power to said control chip during initial power-up phase.

5. The control chip of claim 2 further includes gated circuit means for limiting the turn-on duty cycle of either said standby power MOSFET or said main power MOSFET to no more than 50%.

6. The power system according to claim 2, wherein said first feedback connection terminal of said control chip receives a feedback signal from said bias voltage via a pair of divider resistors, and said first regulation means regulates said bias voltage instead of said standby output voltage.

7. The power system according to claim 2, further includes a sleep-mode control means for disabling said main power unit by transmitting a shut-down signal to said second feedback connection terminal via a third photo-coupler device.

8. The control chip of claim 2 further includes a first voltage clamping device coupled to said first regulation means for limiting the maximum power of said standby power unit to no more than 10 watts.

9. The control chip of claim 8 further includes a second voltage clamping device coupled to said second regulation means for limiting the maximum power of said main power unit to no more than 160 watts.

10. The power system according to claim 2, wherein said standby power MOSFET and said main power MOSFET are replaced by bipolar transistor devices.

* * * * *